(12) United States Patent
Liu et al.

(10) Patent No.: US 9,769,808 B2
(45) Date of Patent: Sep. 19, 2017

(54) METHOD AND DEVICE FOR ALLOCATING AND DETECTING DOWNLINK CONTROL CHANNEL RESOURCES

(71) Applicant: Alcatel Lucent, Boulogne Billancourt (FR)

(72) Inventors: Zheng Liu, Shanghai (CN); Qi Jiang, Shanghai (CN); Jianguo Liu, Shanghai (CN); Feng Han, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 22 days.

(21) Appl. No.: 14/386,751

(22) PCT Filed: Mar. 18, 2013

(86) PCT No.: PCT/IB2013/000598
§ 371 (c)(1),
(2) Date: Sep. 19, 2014

(87) PCT Pub. No.: WO2013/140241
PCT Pub. Date: Sep. 26, 2013

(65) Prior Publication Data
US 2015/0049700 A1     Feb. 19, 2015

(30) Foreign Application Priority Data
Mar. 20, 2012     (CN) .......................... 2012 1 0074755

(51) Int. Cl.
*H04W 4/00*     (2009.01)
*H04W 72/04*     (2009.01)
(Continued)

(52) U.S. Cl.
CPC ......... *H04W 72/042* (2013.01); *H04L 5/0039* (2013.01); *H04L 5/0053* (2013.01);
(Continued)

(58) Field of Classification Search
CPC ............. H04W 72/04; H04W 72/0406; H04W 72/042; H04W 72/044; H04W 72/0446;
(Continued)

(56) References Cited

U.S. PATENT DOCUMENTS

| | | | |
|---|---|---|---|
| 2011/0044391 A1* | 2/2011 | Ji | ......................... H04L 5/0007 375/260 |
| 2011/0110316 A1* | 5/2011 | Chen | ..................... H04L 5/0053 370/329 |

(Continued)

FOREIGN PATENT DOCUMENTS

| | | |
|---|---|---|
| CN | 102164416 A | 8/2011 |
| CN | 102355732 A | 2/2012 |

(Continued)

OTHER PUBLICATIONS

Panasonic, "Multiplexing of ePDCCHs and ePDCCH RE mapping," 3GPP TSG RAN WG1 Meeting #68, Dresden, Germany, Feb. 6-10, 2012, R1-120237, Agenda Item: 7.6.4, Document for: Discussion/Decision, 4 pages.

(Continued)

*Primary Examiner* — Kevin Mew
(74) *Attorney, Agent, or Firm* — Fay Sharpe, LLP (57) ABSTRACT

Embodiments of the present invention disclose methods and devices for allocating and detecting downlink control channel resources. The method for allocating downlink control channel resources comprises: allocating a resource area for enhanced Physical Downlink Control Channel, ePDCCH, localized transmission in a UE-specific way; and allocating at most one ePDCCH candidate for the ePDCCH localized transmission in each resource allocation granularity within the resource area. According to the embodiments of the present invention, the ePDCCH candidates at each aggregation level are distributed to radio resources sparsely so (Continued)

that sufficient options can be provided for resource allocation.

15 Claims, 8 Drawing Sheets

(51) Int. Cl.
  *H04L 27/26* (2006.01)
  *H04L 5/00* (2006.01)
  *H04W 8/00* (2009.01)

(52) U.S. Cl.
  CPC ...... *H04L 27/2607* (2013.01); *H04L 27/2653* (2013.01); *H04W 8/005* (2013.01)

(58) Field of Classification Search
  CPC .............. H04W 72/0453; H04W 8/005; H04L 27/2607; H04L 27/2653; H04L 5/0039; H04L 5/0053
  See application file for complete search history.

(56) References Cited

U.S. PATENT DOCUMENTS

| | | | |
|---|---|---|---|
| 2011/0170496 A1* | 7/2011 | Fong | H04L 5/0053 370/329 |
| 2011/0249633 A1* | 10/2011 | Hong | H04L 5/0053 370/329 |
| 2011/0317653 A1 | 12/2011 | Kwon et al. | |
| 2012/0106465 A1* | 5/2012 | Haghighat | H04W 72/1289 370/329 |
| 2013/0003604 A1* | 1/2013 | Blankenship | H04L 5/0053 370/255 |
| 2013/0039284 A1* | 2/2013 | Marinier | H04L 5/001 370/329 |
| 2013/0044664 A1* | 2/2013 | Nory | H04L 1/0045 370/311 |
| 2013/0044692 A1* | 2/2013 | Nory | H04L 25/0228 370/329 |
| 2013/0114517 A1* | 5/2013 | Blankenship | H04L 5/0053 370/329 |
| 2013/0195020 A1* | 8/2013 | Frederiksen | H04W 72/042 370/329 |
| 2013/0195068 A1* | 8/2013 | Baker | H04L 5/0023 370/330 |
| 2013/0230017 A1* | 9/2013 | Papasakellariou | H04W 72/0406 370/330 |
| 2013/0242750 A1* | 9/2013 | Baker | H04W 72/042 370/241 |
| 2013/0242886 A1* | 9/2013 | Chen | H04W 52/243 370/329 |
| 2013/0242904 A1* | 9/2013 | Sartori | H04L 5/0053 370/329 |
| 2013/0242906 A1* | 9/2013 | Li | H04L 5/0053 370/329 |
| 2013/0250880 A1* | 9/2013 | Liao | H04W 72/042 370/329 |
| 2013/0279628 A1* | 10/2013 | Mizuta | H04B 7/0417 375/296 |
| 2014/0036810 A1* | 2/2014 | Harrison | H04W 72/042 370/329 |
| 2014/0105154 A1* | 4/2014 | Yang | H04L 5/0053 370/329 |
| 2014/0169328 A1* | 6/2014 | Ahimezawa | H04B 7/0452 370/330 |
| 2014/0307700 A1* | 10/2014 | Seo | H04L 5/0053 370/329 |
| 2014/0328312 A1* | 11/2014 | Seo | H04L 1/1861 370/329 |
| 2014/0369437 A1* | 12/2014 | Horiuchi | H04B 7/0689 375/267 |
| 2015/0049700 A1* | 2/2015 | Liu | H04L 27/2607 370/329 |
| 2015/0092690 A1* | 4/2015 | Seo | H04W 72/042 370/329 |
| 2015/0237607 A1* | 8/2015 | Frederiksen | H04L 5/0053 370/329 |
| 2015/0257131 A1* | 9/2015 | Wong | H04L 5/001 370/329 |
| 2015/0327271 A1* | 11/2015 | Wu | H04L 5/0048 370/329 |
| 2015/0365964 A1* | 12/2015 | Jiang | H04L 5/001 370/329 |

FOREIGN PATENT DOCUMENTS

| | | |
|---|---|---|
| CN | 103178932 A | 6/2013 |
| JP | 2012-503893 A | 2/2012 |
| JP | 2012-235353 A | 11/2012 |
| RU | 2 437 222 C2 | 12/2011 |
| RU | 2 438 260 C2 | 12/2011 |
| WO | 2011/037439 A2 | 3/2011 |
| WO | 2011/043616 A2 | 4/2011 |

OTHER PUBLICATIONS

Huawei, Hisilicon, "Search space design for ePDCCH," 3GPP TSG RAN WG1 Meeting #68, Dresden, Germany, Feb. 6-10, 2012, R1-120048, Agenda Item: 7.6.3, Document for: Discussion and decision, 5 pages.

KDDI Corporation, "Configuration of localized and distributed transmission for E-PDCCH," 3GPP TSG RAN WGI Meeting #68, Dresden, Germany, Feb. 6-10, 2012, Agenda Item: 7.6.3, R1-120681, Document for: Discussion and Decision, 3 pages.

Fujitsu, "Search Space Design for Downlink Control Channel," $3^{rd}$ Generation Partnership Project (3GPP), 3GPP TSG RAN WG1 Meeting #68, R1-120752, pp. 1-6, XP050563277, Dresden, Germany, Feb. 6-10, 2012.

Apple Inc., "On the Structure and Usage Scenarios of ePDCCH," $3^{rd}$ Generation Partnership Project (3GPP), 3GPP TSG RAN WG1 Meeting #67, R1-114300, pp. 1-9, XP002707316, San Francisco, USA, Nov. 14-18, 2011.

Alcatel-Lucent Shanghai Bell et al., "Search Space Design for ePDCCH," $3^{rd}$ Generation Partnership Project (3GPP), 3GPP TSG RAN WG1 Meeting #68bis, R1-121252, 3 pages, XP50599541, Jeju, Korea, Mar. 26-30, 2012.

NTT DOCOMO, "Mapping Design for E-PDCCH in Rel-11," 3GPP TSG RAN WG1 Meeting #68, Dresden, Germany, Feb. 6-10, 2012, R1-120411, Agenda Item: 7.6.4, Document for: Discussion and Decision, 8 pages.

* cited by examiner

METHOD AND DEVICE FOR ALLOCATING AND DETECTING DOWNLINK CONTROL CHANNEL RESOURCES

TECHNICAL FIELD

Embodiments of the present invention relate to the technical field of communication, and more specifically, to methods and devices for allocating and detecting downlink control channel resources.

DESCRIPTION OF THE RELATED ART

An enhanced Physical Downlink Control Channel (ePDCCH) occupying Physical Downlink Shared Channel (PDSCH) resources has been introduced in the technical standard of 3GPP Long-Term Evolution (LTE) Release 11. A downlink control channel in LTE can carry Downlink Control Information (DCI) messages of User Equipments (UEs). These messages may be transmitted using different time-frequency transmission resources and may use different amounts of resources.

According to the specification of 3GPP RAN 1, the ePDCCH supports two types of transmission, namely distributed transmission and localized transmission. By distributed transmission, resources allocated to UEs may spread to the entire system bandwidth, and thus frequency diversity gain may be attained. By localized transmission, better frequency resources may be selected and further allocated to UEs, and thus frequency selective gain may be attained which is a significant target of ePDCCH localized transmission. By utilizing ePDCCH localized transmission, precoding gain can also be achieved based on a CSI feedback. The basic resource element of a legacy Physical Downlink Control Channel (PDCCH) in LTE is referred to as a Control Channel Element (CCE), one CCE containing 36 Resource Elements (REs). For the ePDCCH, a similar resource element is also defined, which is called an enhanced CCE (eCCE). The size of the eCCE may vary with the number of available REs in a Physical Resource Block (PRB) pair used in ePDCCH transmission.

In PDCCH transmission, the amounts of CCEs for different DCI messages vary according to different aggregation level (for example 1, 2, 4 or 8) of CCEs. A UE that is expecting to receive DCI messages must check a predetermined number of different combinations of time-frequency resources and aggregation levels in order to ascertain whether a DCI message has been sent to this UE in a given subframe. The set of combinations which a UE must check is known as a search space. In the search space, blind decoding is utilized for each UE to determine whether a DCI message is present or not. The search space for PDCCH is defined in terms of the starting CCE, the number of candidates per aggregation level, and the particular DCI formats (the number of information bits per DCI message) to be received.

The DCI receiving procedure in PDCCH could be reused for ePDCCH distributed transmission by merely using eCCE instead of CCE. However, for ePDCCH localized transmission, since frequency selective configuration is implemented based on localized CSI and interleaving is not supported, the existing DCI receiving procedure of PDCCH cannot be reused. Expansion and modification are needed and specific candidate distribution rules should be defined to accommodate new features such as the application of precoding and the transparent DCI message transmission.

So far there is no solution for allocating and determining ePDCCH candidates used for DCI messages with respect to ePDCCH localized transmission.

SUMMARY OF THE INVENTION

In view of drawbacks in the prior art, embodiments of the present invention provide methods and devices for allocating and detecting downlink control channel resources.

According to a first aspect of the present invention, there is provided a method for allocating downlink control channel resources. The method comprises: allocating a resource area for ePDCCH localized transmission in a UE specific way; and allocating at most one ePDCCH candidate for the ePDCCH localized transmission in each resource allocation granularity within the resource area.

According to a second aspect of the present invention, there is provided a method for detecting downlink control channel resources. The method comprises: obtaining information on a resource area, wherein the resource area is allocated for ePDCCH localized transmission in a UE specific way; and detecting ePDCCH candidates within the resource area for reception on the ePDCCH, wherein each resource allocation granularity within the resource area comprises at most one ePDCCH candidate.

According to a third aspect of the present invention, there is provided a device for allocating downlink control channel resources. The device comprises: a resource area allocation module for allocating a resource area for ePDCCH localized transmission in a UE specific way; and a candidate allocation module for allocating at most one ePDCCH candidate for the ePDCCH localized transmission in each resource allocation granularity within the resource area.

According to a fourth aspect of the present invention, there is provided a device for detecting downlink control channel resources. The device comprises: a resource area obtaining module for obtaining information on a resource area, wherein the resource area is allocated for ePDCCH localized transmission in a UE specific way; and a candidate detection module for detecting ePDCCH candidates within the resource area for reception on the ePDCCH, wherein each resource allocation granularity within the resource area comprises at most one ePDCCH candidate.

By distributing the ePDCCH candidates at each aggregation level to radio resources sparsely, the embodiments of the present invention can achieve some decorrelation over the frequency domain, and can provide sufficient options for resource allocation so as to select radio resources that is potentially seen to have superior frequency domain conditions. As a result, more frequency selective gain is desirable and the frequency spectrum efficiency is improved.

BRIEF DESCRIPTION OF THE DRAWINGS

The above and other features of the present invention will become more apparent from the detailed description of embodiments with reference to the figures, wherein the same reference numerals represent the same or similar elements. In the figures.

DETAILED DESCRIPTION OF THE PREFERRED EMBODIMENT

Embodiments of the present invention will be explained and illustrated in more detail with reference to the figures. It is to be understood that the figures and embodiments of the present invention are only intended for the purpose of illustration, but not intended to limit the protection scope of the present invention.

The flowchart and block diagrams in the figures illustrate the architecture, functionality and operation of possible implementations of systems, methods and devices according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by dedicated hardware-based systems that perform the specified functions or operations, or combinations of dedicated hardware and computer instructions.

With reference to the figures, various embodiments of the present invention are described in detail below by way of example.

Figure 1:
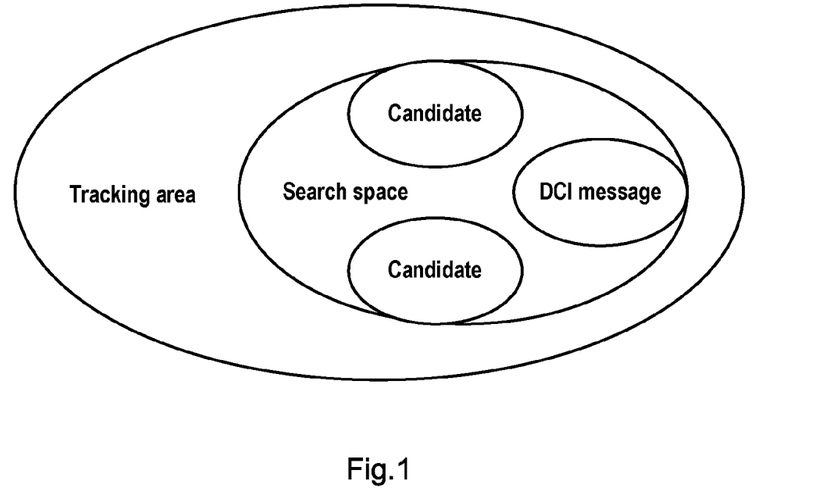
FIG. 1 schematically shows the procedure of deriving a matched DCI message by a UE according to one embodiment of the present invention.

FIG. 1 schematically shows the procedure of deriving a matched DCI message by a UE according to one embodiment of the present invention. The largest area in FIG. 1 is called a tracking area, which denotes the potential radio resources allocated for the UE's ePDCCH transmission. Subsequently, according to an offset value of the UE Identifier (ID), a reduced area is obtained as a UE-specific search space. In the search space, the UE can carry out blind decoding to detect resources configured for the DCI message. Then, the UE can read out the corresponding downlink scheduling information based on the detection result. Note that each of all the areas shown in FIG. 1 comprises a number of PRB pairs, and the search space at each aggregation level consists of a set of PRB pairs, wherein the number of PRB pairs in the set is configurable. The number of three PRB pairs, as shown in FIG. 1, is merely a simple example.

Hereinafter, description is presented below with respect to examples of a resource allocation method for Downlink Control Information according to the embodiments of the present invention.

Figure 2:
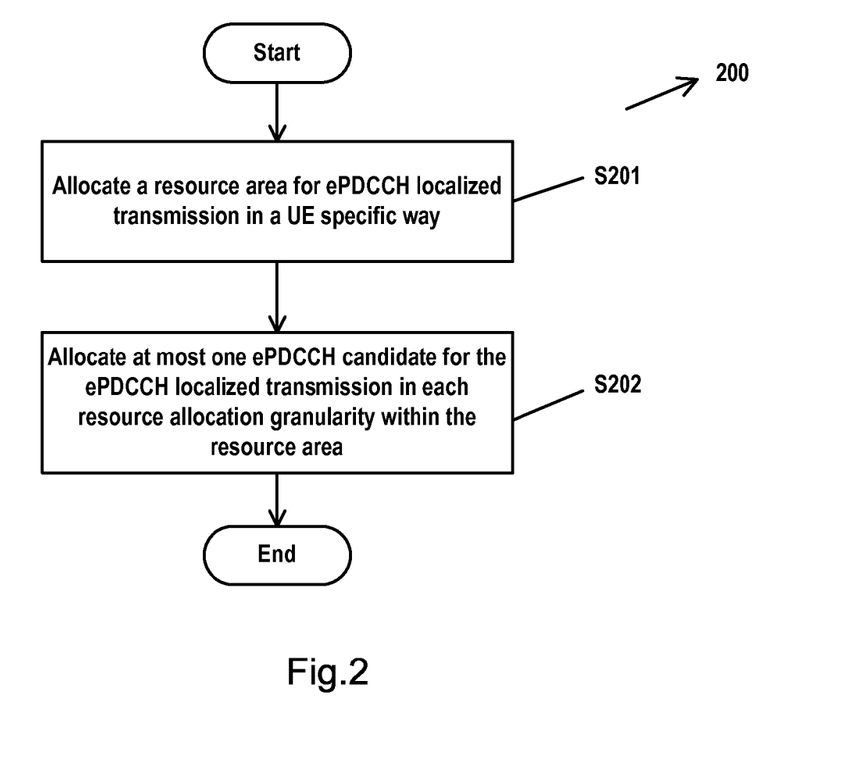
FIG. 2 shows a flowchart of method 200 for allocating downlink control channel resources according to one embodiment of the present invention.

FIG. 2 shows a flowchart of method 200 for allocating downlink control channel resources according to one embodiment of the present invention, wherein method 200 may comprise additional steps and/or the steps as illustrated may be omitted for execution.

After method 200 shown in FIG. 2 starts, in step S201, a resource area for ePDCCH localized transmission is allocated in a UE Specific way. The so-called "UE specific way" refers to allocating different resource areas to different UEs.

In step S202, at most one ePDCCH candidate is allocated for the ePDCCH localized transmission in each resource allocation granularity within the resource area.

As such downlink control channel resources are allocated efficiently. In this manner, the ePDCCH candidates can be distributed sparsely in the allocated frequency band resources, and can provide sufficient frequency options for ePDCCH localized transmission so as to maximize the frequency selective gain.

Figure 3:
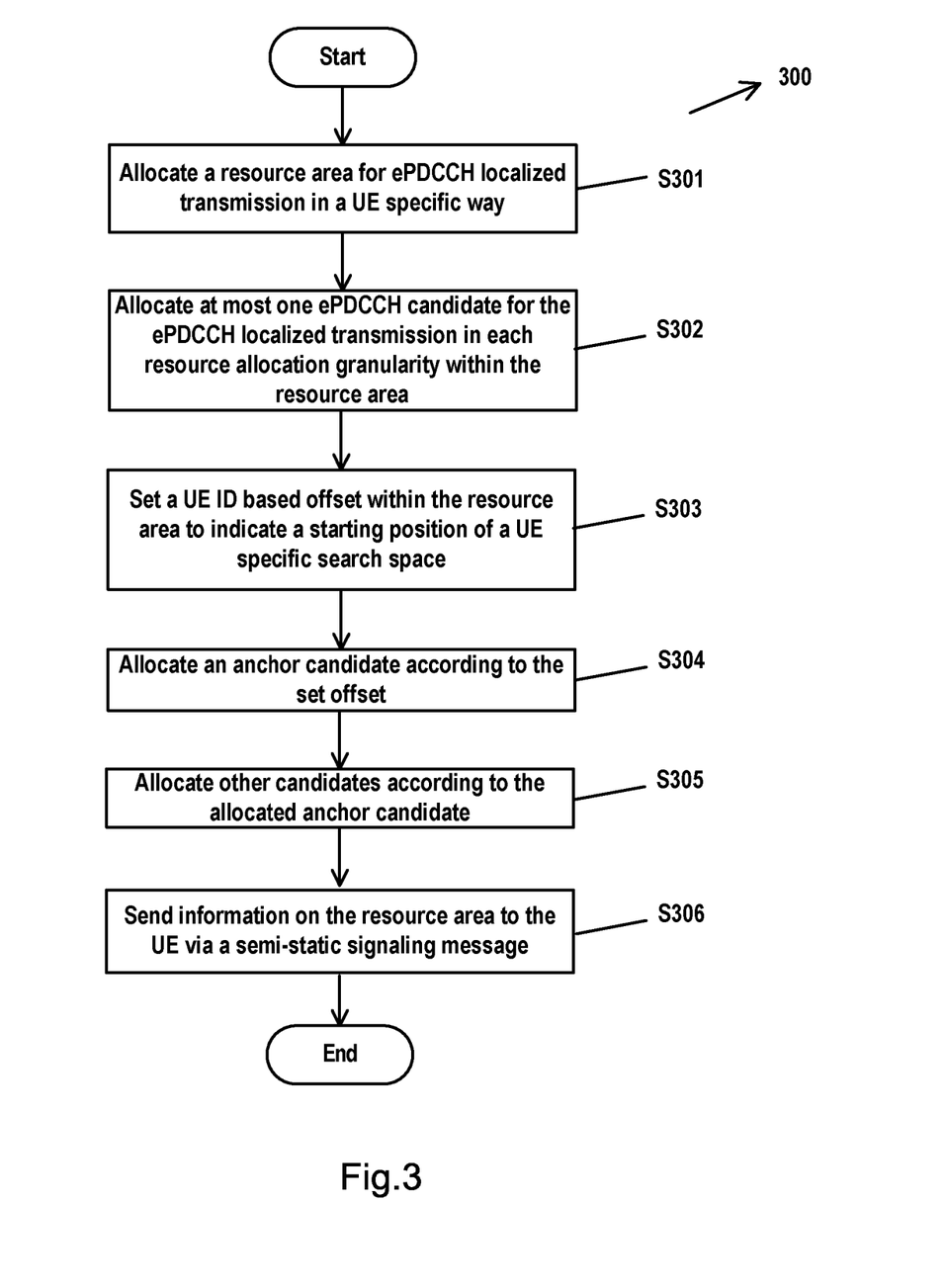
FIG. 3 shows a flowchart of method 300 for allocating downlink control channel resources according to another embodiment of the present invention.

With reference to FIG. 3 below, illustration is present with respect to another embodiment of a method for allocating downlink control channel resources. Method 300 can be regarded as a specific implementation of method 200 that has been described above with reference to FIG. 2.

In step S301, a resource area for ePDCCH localized transmission is allocated in a UE Specific way. This step corresponds to step S201 in FIG. 2, and thus concrete technical details thereof are omitted here. In particular, in one embodiment, the resource area allocated in step S301 can be a tracking area. Alternatively, the resource area also can be other area made up of granularities for the resource allocation. As the ePDCCH is located in the PDSCH resource area, the ways of resource allocation for PDSCH could be reused for ePDCCH. The resource allocation granularity can be a subband size of which is dependent on available frequency bands or PRB pairs. A subband may comprise one or more PRB pairs.

Figure 4:
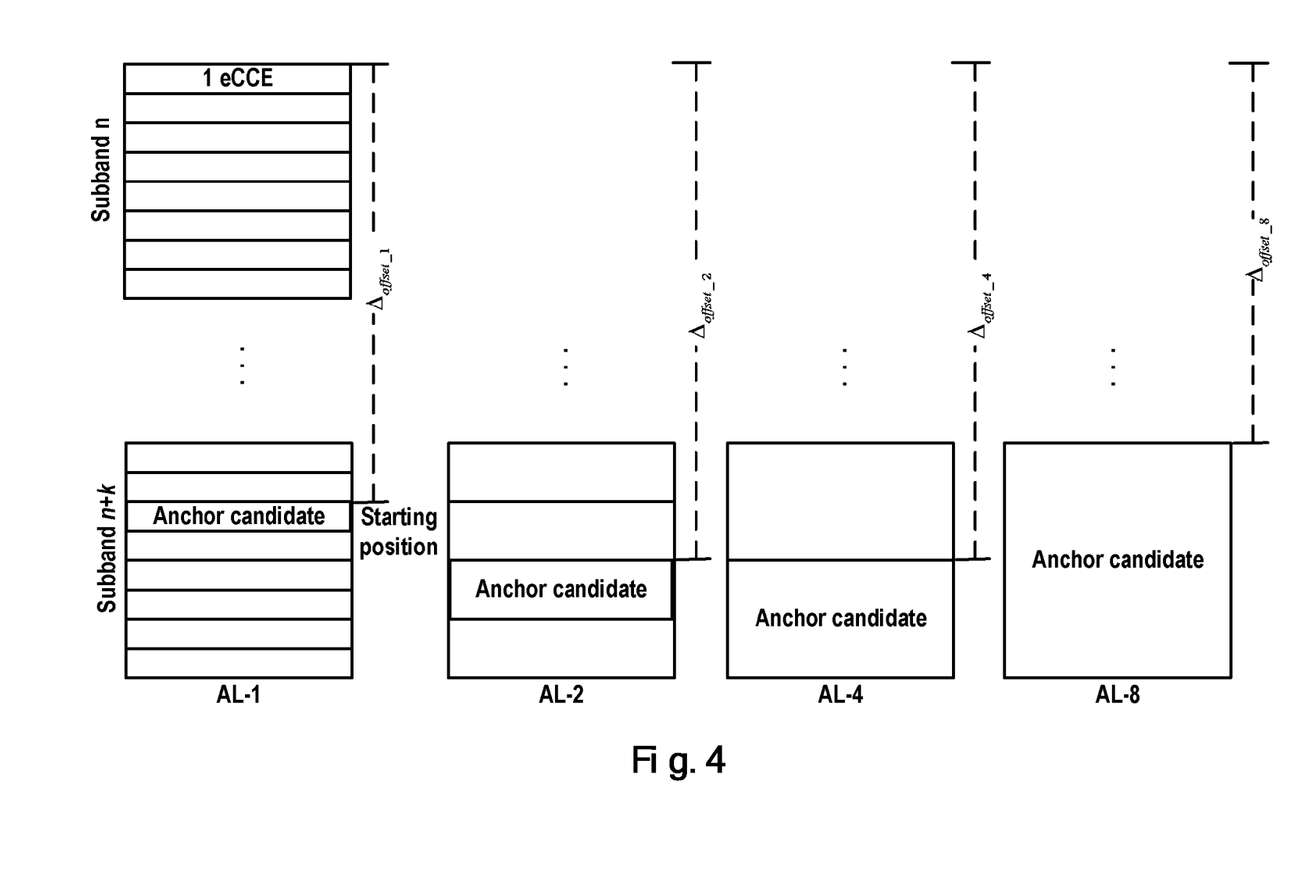
FIG. 4 shows an example of resource allocation in ePDCCH localized transmission according to one embodiment of the present invention.

FIG. 4 shows an example of resource allocation for ePDCCH localized transmission according to one embodiment of the present invention. For the purpose of simplicity, the example in FIG. 4 merely uses subbands for illustration, but is not intended to be limited to subbands and can use other resource allocation granularity, e.g., PRB pairs.

In one embodiment, the set of the subbands allocated for ePDCCH can be continuous or intermitted depending on the resource allocation type. One subband consists of multiple eCCEs which can be used to carry DCI messages.

Returning to FIG. 3, in step S302, at most one ePDCCH candidate is allocated for the ePDCCH localized transmission in each resource allocation granularity within the resource area. In one embodiment, in step S302 at most one ePDCCH candidate is allocated in each resource allocation granularity for each aggregation level, so that the ePDCCH candidates at each aggregation level spread to different granularities for resource allocation and the frequency selective gain is maximized.

Subsequently, method 300 proceeds to step S303, wherein within the tracking area, a UE ID based offset is set to indicate a starting position of a UE specific search space. Different offset values can be applied for different aggregation levels and the value is in terms of the number of aggregated sets of eCCEs. The size of the aggregated set corresponds to the level number of the aggregation level. At each aggregation level, the number of eCCEs occupied by the candidate is the same as the level number. As shown in FIG. 4, the aggregated set of eCCEs consists of only one eCCE at aggregation level 1 (AL-1), two eCCEs at aggregation level 2 (AL-2) and so on. The variable $\Delta_{\mathit{offset\_n}}$ (n=1, 2, 4, 8) is used to denote the offset at aggregation level n in FIG. 4.

With the UE ID based offset, the area (e.g., search space) where a UE performs resource search can be dedicated to a certain UE. The introduction of the UE ID based offsets makes resources for the ePDCCH configurable for UEs in the frequency domain so as to provide sufficient freedom for ePDCCH configuration.

In one embodiment, the offset value at each aggregation level can be determined by a hash function based on UE ID. The hash function can provide sufficient randomness and ergodicity in the configured area. However, the present invention is not limited to a particular function, but can use any appropriate hash function or any other appropriate function.

In an optional step S304, an anchor candidate is allocated according to the set offset. The anchor candidate of each UE can occupy a different number of subbands at each aggregation level and can be located at a different position. In one embodiment, the anchor candidate can be set in the first subband after the offset.

Next, in step S305, other candidates are allocated according to the allocated anchor candidate. In one embodiment, the positions of all other candidates in corresponding resource allocation granularities are the same as the anchor candidate. In one embodiment, a bundling relationship between a candidate and a Demodulation Reference Signal (DMRS) configuration may be set. For example, radio resources of a candidate are bundled with antenna ports as well as scrambling sequences. In this manner, the operation of detecting a candidate by a UE can be simplified, and meanwhile all candidates per aggregation level can share the same DMRS configuration, which will reduce the system overhead needed for notifying UEs of corresponding information.

In step S306, information on the resource area is sent to the UE via a semi-static signaling message, so that the allocated resource area can be informed to the UE, and the resource allocation can be only changed semi-statically. In one embodiment, the semi-static signaling is Radio Resource Control (RRC) signaling.

By spreading the candidates at each aggregation level onto different subbands and setting the UE ID based offset value, the number of candidates can be configured by the resource allocation of the tracking area, and the flexibility of resource allocation can be maintained even when the potential ePDCCH area is configured by semi-static signaling (e.g., RRC signaling). Accordingly, the maximal number of blind decoding would be configurable, which provides more flexibility for candidate allocation.

Description is presented below with respect to an example of a method for detecting downlink control channel resources according to the embodiments of the present invention.

Figure 5:
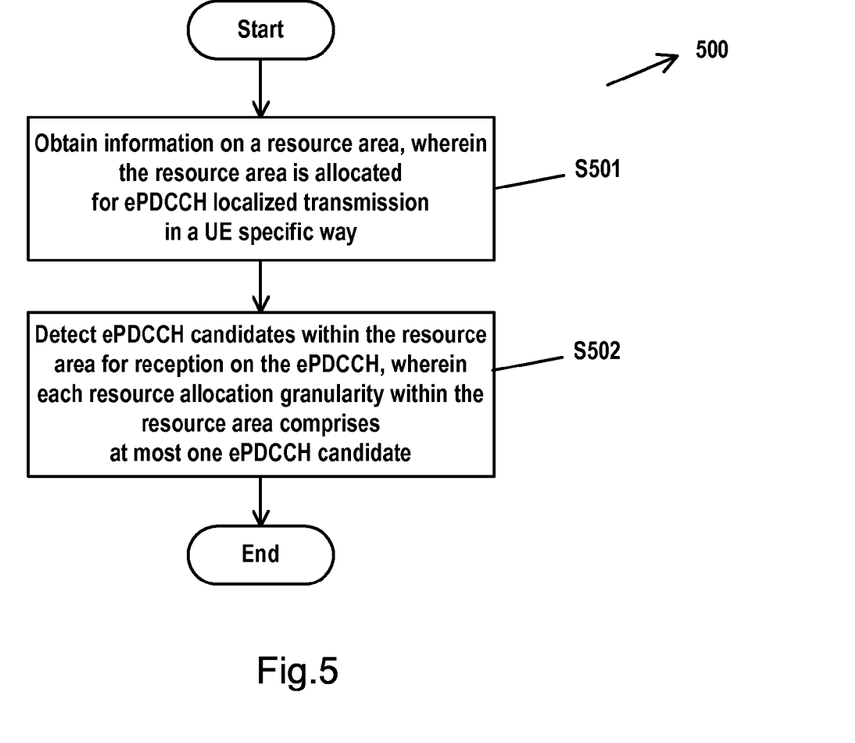
FIG. 5 shows a flowchart of method 500 for detecting downlink control channel resources according to one embodiment of the present invention.

FIG. 5 shows a flowchart of method 500 for detecting downlink control channel resources according to one embodiment of the present invention.

In step S501, information on a resource area is obtained, wherein the resource area is allocated for ePDCCH localized transmission in a UE specific way.

In step S502, ePDCCH candidates within the resource area are detected for reception on the ePDCCH, wherein each resource allocation granularity within the resource area comprises at most one ePDCCH candidate.

Figure 6:
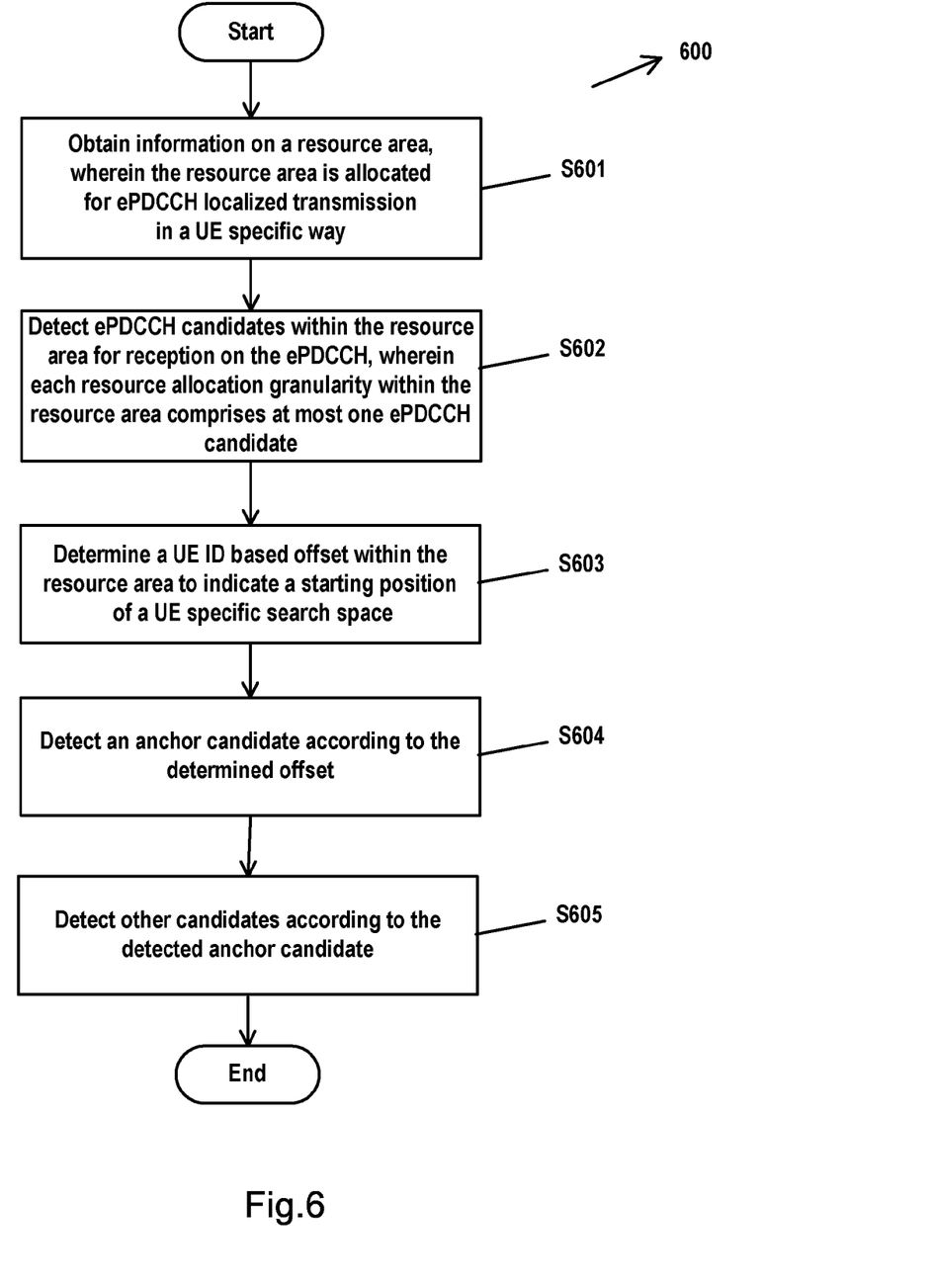
FIG. 6 shows a flowchart of method 600 for detecting downlink control channel resources according to another embodiment of the present invention.

With reference to FIG. 6, illustration is presented with respect to another embodiment of a method for detecting downlink control channel resources. Method 600 can be regarded as a specific implementation of method 500 that has been described above with reference to FIG. 5.

In step S601, information on a resource area is obtained, wherein the resource area is allocated for ePDCCH localized transmission in a UE specific way. In one embodiment, the information on a resource area is obtained from a received semi-static signaling (e.g., RRC signaling) message.

In step S602, ePDCCH candidates within the resource area are detected for reception on the ePDCCH, wherein each resource allocation granularity within the resource area comprises at most one ePDCCH candidate.

Subsequently, method 600 proceeds to step S603, where a UE ID based offset within the resource area is determined to indicate a starting position of a UE specific search space.

Then, in optional step S604, an anchor candidate is detected according to the determined offset.

Next, in step S605, other candidates are detected according to the detected anchor candidate.

According to the embodiments of the present invention, various embodiments that have been described in methods 200 and 300 for allocating downlink control channel resources are also applicable to methods 500 and 600 for detecting downlink control channel resources. Concrete details are omitted here.

Figure 7:
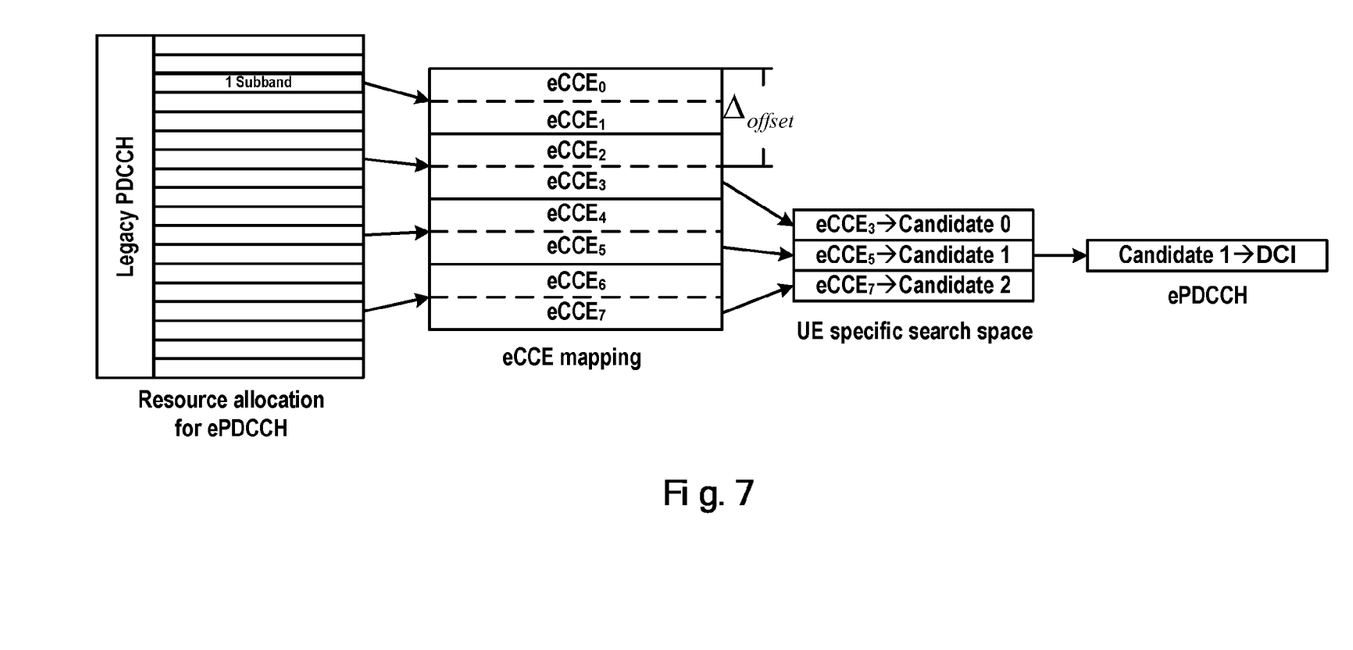
FIG. 7 shows an example of a complete procedure of the DCI detection in ePDCCH localized transmission according to one embodiment of the present invention.

FIG. 7 shows an example of a complete procedure of the DCI detection for ePDCCH localized transmission, wherein aggregation level 1 is taken as an example and a subband is assumed to comprise one PRB pair.

From this example it can be clearly seen that according to the principle of allocating at most one candidate in each resource allocation granularity, the UE ID based offset value and the configuration of the anchor candidate, all candidates can be obtained, and further the matched DCI can be obtained by blind decoding.

Note that the total number of blind decoding may split among multiple spatial layers if spatial multiplexing transmission (e.g., Multi-User MIMO, MU-MIMO) is supported by ePDCCH. The present invention is not limited to a concrete way of blind decoding and can use different blind decoding.

The methods for allocating and detecting ePDCCH resources as proposed in the embodiments of the present invention can satisfy ePDCCH's larger capacity demand over legacy PDCCH, efficiently use the frequency selective gain, and provide sufficient flexibility for resource allocation for ePDCCH localized transmission.

It is to be understood that methods 200 and 300 are generally executed at a network side, while methods 500 and 600 are generally executed at a terminal side. In addition, methods 200, 300, 500 and 600 can comprise additional steps and/or the steps as illustrated may be omitted for execution. The scope of the present invention is not limited in this regard.

Figure 8:
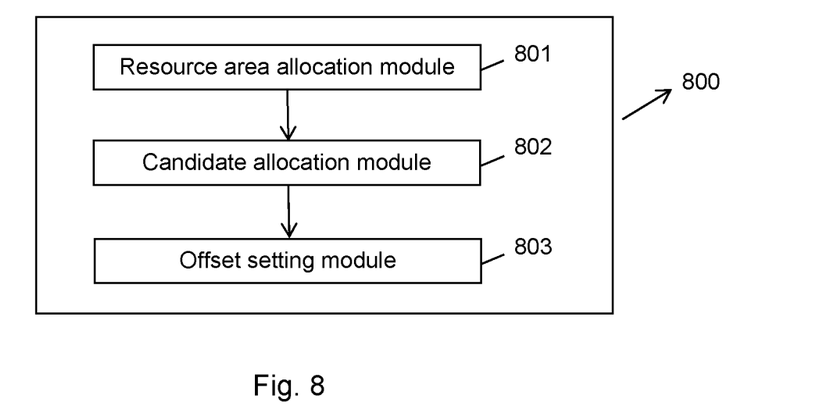
FIG. 8 shows a block diagram of device 800 for allocating downlink control channel resources according to one embodiment of the present invention.
Figure 9:
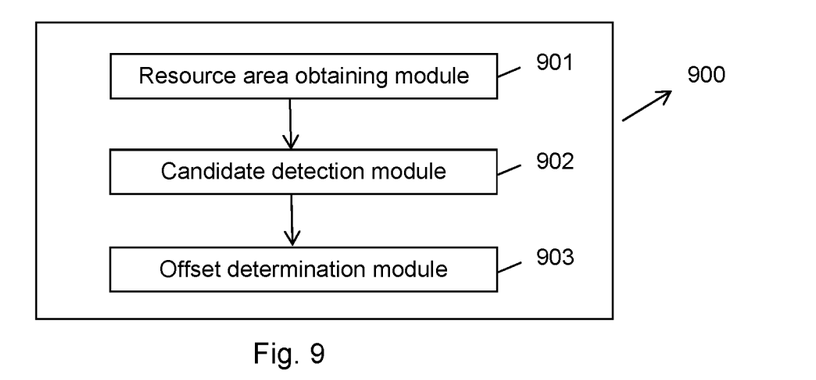
FIG. 9 shows a block diagram of device 900 for detecting downlink control channel resources according to one embodiment of the present invention.

With reference to FIGS. 8 and 9 now, illustration is presented with respect to devices capable of executing methods 200, 300, 500 and 600, wherein FIG. 8 shows a block diagram of device 800 for allocating downlink control channel resources according to one embodiment of the present invention, and FIG. 9 shows a block diagram of device 900 for detecting downlink control channel resources according to one embodiment of the present invention.

Device 800 as shown in FIG. 8 comprises resource area allocation module 801 and candidate allocation module 802, wherein the resource area allocation module is configured to allocate a resource area for ePDCCH localized transmission in a UE specific way. Candidate allocation module 802 is configured to allocate at most one ePDCCH candidate for the ePDCCH localized transmission in each resource allocation granularity within the resource area.

In one embodiment, device 800 further comprises offset setting module 803 configured to set a UE ID based offset within the resource area to indicate a starting position of a UE specific search space.

In one embodiment, candidate allocation module 802 is further configured to allocate an anchor candidate according to the set offset.

In one embodiment, candidate allocation module 802 is further configured to allocate other candidates based on the allocated anchor candidate.

In one embodiment, resource area allocation module 801 is further configured to send information on the resource area to the UE via a semi-static signaling message.

Device 900 as shown in FIG. 9 comprises resource area obtaining module 901 and candidate detection module 902, wherein resource area obtaining module 901 is configured to obtain information on a resource area, wherein the resource area is allocated for ePDCCH localized transmission in a UE specific way. Candidate detection module 902 is configured to detect ePDCCH candidates within the resource area for reception on the ePDCCH, wherein each resource allocation granularity within the resource area comprises at most one ePDCCH candidate.

In one embodiment, device 900 further comprises offset determination module 903 configured to determine a UE ID based offset within the resource area to indicate a starting position of a UE specific search space.

In one embodiment, candidate detection module 902 is further configured to detect an anchor candidate according to the determined offset.

In one embodiment, candidate detection module 902 is further configured to detect other candidates based on the detected anchor candidate.

In one embodiment, resource area obtaining module 901 is further configured to obtain information on the resource area from a received semi-static signaling message.

It will be understood that each module in device 800 corresponds to each step in method 200 described with reference to FIG. 2 and method 300 described with reference to FIG. 3, and also, each module in device 900 corresponds to each step in method 500 described with reference to FIG. 5 and method 600 described with reference to FIG. 6. Accordingly, the operations and features that have been described above with reference to FIGS. 2, 3, 5 and 6 are also applicable to devices 800, 900 and the modules comprised therein, which are not detailed here.

It will further be understood that usually device 800 can be implemented in a network element, e.g., a base station, while device 900 can be implemented in a terminal, e.g., UE. In the embodiments of the present invention, the base station can be a macro base station, a micro base station, a home base station or a relay base station, etc. The UE can be various types of terminal, such as a mobile phone, a digital personal assistant (PDA), a portable computer, etc.

Devices 800 and 900 can be implemented in various forms. For example, in some embodiments devices 800 and 900 can be implemented using software and/or firmware modules. In addition, devices 800 and 900 can be implemented using hardware modules. Other forms that are currently known or to be developed in future are also feasible. The scope of the present invention is not limited in this regard.

It will be explained that the methods as disclosed in the present invention can be implemented in software, hardware or combination of software and hardware. The hardware portion can be implemented by using dedicated logic; the software portion can be stored in a memory and executed by an appropriate instruction executing system such as a microprocessor, a personal computer (PC) or a mainframe computer. In some embodiments, the present invention is implemented as software, including, without limitation to, firmware, resident software, micro-code, etc.

Moreover, the embodiments of the present invention can be implemented in a form of a computer program product accessible from computer usable or computer readable media that provide program code for use by or in connection with a computer or any instruction executing system. For the purpose of description, a computer-usable or computer-readable medium may be any tangible module that can contain, store, communicate, propagate, or transport the program for use by or in connection with an instruction execution system, apparatus, or device.

The medium may be an electric, magnetic, optical, electromagnetic, infrared, or semiconductor system (apparatus or device), or propagation medium. Examples of the computer-readable medium would include a semiconductor or solid storage device, a magnetic tape, a portable computer diskette, a random access memory (RAM), a read-only memory (ROM), a hard disk, and an optical disk. Examples of the current optical disk include a compact disk read-only memory (CD-ROM), compact disk-read/write (CR-ROM), and DVD.

Note that some more specific technical details that are well known to those skilled in the art and that might be essential to the implementation of the present invention are omitted in the above description in order to make the present invention more easily understood. The specification of the present invention has been presented for purposes of illustration and description, and is not intended to be exhaustive or limit the invention to the form disclosed. Many modifications and variations will be possible for those of ordinary skill in the art.

Therefore, the embodiments are chosen and described in order to best explain the principles of the invention and the practical application, and to enable those skilled in the art to understand that all modifications and variations made without departing from the spirit of the present invention fall into the protection scope of the present invention as defined in the appended claims.

What is claimed is:

1. A method for allocating downlink control channel resources, comprising:
   allocating a resource area for enhanced Physical Downlink Control Channel, ePDCCH, localized transmission in a user equipment, UE, specific way such that each resource area is allocated to a different UE; and
   allocating at most one ePDCCH candidate for the ePDCCH localized transmission in each resource allocation granularity within the resource area;

wherein each resource allocation granularity comprises a subband, the size of which is dependent on at least one of available frequency bands and physical resource block (PRB) pairs.

2. The method according to claim 1, further comprising:
setting a UE identifier based offset within the resource area to indicate a starting position of a UE specific search space.

3. The method according to claim 2, further comprising:
allocating an anchor candidate according to the set offset.

4. The method according to claim 3, further comprising:
allocating other candidates based on the allocated anchor candidate.

5. The method according to claim 1, further comprising:
sending information on the resource area to the UE via a semi-static signaling message.

6. A method for detecting downlink control channel resources, comprising:
obtaining information on a resource area, wherein the resource area is allocated for enhanced Physical Downlink Control Channel, ePDCCH, localized transmission in a user equipment, UE, specific way; and
detecting ePDCCH candidates within the resource area for reception on the ePDCCH, wherein each resource allocation granularity within the resource area comprises at most one ePDCCH candidate;
wherein each resource area is allocated to a different UE; and
wherein each resource allocation granularity comprises a subband, the size of which is dependent on at least one of available frequency bands and physical resource block (PRB) pairs.

7. The method according to claim 6, further comprising:
determining a UE identifier based offset within the resource area to indicate a starting position of a UE specific search space.

8. The method according to claim 7, further comprising:
detecting an anchor candidate according to the determined offset.

9. The method according to claim 8, further comprising:
detecting other candidates based on the detected anchor candidate.

10. A device for allocating downlink control channel resources, comprising:
one or more processors configured to execute:
a resource area allocation module configured to allocate a resource area for enhanced Physical Downlink Control Channel, ePDCCH, localized transmission in a user equipment, UE, specific way; and
a candidate allocation module configured to allocate at most one ePDCCH candidate for the ePDCCH localized transmission in each resource allocation granularity within the resource area;
wherein each resource area is allocated to a different UE; and
wherein each resource allocation granularity comprises a subband, the size of which is dependent on at least one of available frequency bands and physical resource block (PRB) pairs.

11. The device according to claim 10, wherein the one or more processors is further configured to execute:
an offset setting module configured to set a UE identifier based offset within the resource area to indicate a starting position of a UE specific search space.

12. The device according to claim 11, wherein the candidate allocation module is further configured to allocate an anchor candidate according to the set offset.

13. A device for detecting downlink control channel resources, comprising:
one or more processors configured to execute:
a resource area obtaining module configured to obtain information on a resource area, wherein the resource area is allocated for enhanced Physical Downlink Control Channel, ePDCCH, localized transmission in a user equipment, UE, specific way; and
a candidate detection module configured to detect ePDCCH candidates within the resource area for reception on the ePDCCH, wherein each resource allocation granularity within the resource area comprises at most one ePDCCH candidate;
wherein each resource area is allocated to a different UE; and
wherein each resource allocation granularity comprises a subband, the size of which is dependent on at least one of available frequency bands and physical resource block (PRB) pairs.

14. The device according to claim 13, wherein the one or more processors is further configured to execute:
an offset determination module configured to determine a UE identifier based offset within the resource area to indicate a starting position of a UE specific search space.

15. The device according to claim 14, wherein the candidate detection module is further configured to detect an anchor candidate according to the determined offset.

* * * * *